United States Patent [19]

Shimazaki et al.

[11] Patent Number: 4,934,571
[45] Date of Patent: Jun. 19, 1990

[54] CARRIER BAG FOR A VEHICLE

[75] Inventors: Takayuki Shimazaki, Tokyo; Kazuhiro Kawasaki, Saitama, both of Japan

[73] Assignee: Honda Giken Kogyo Kabushiki Kaisha, Tokyo, Japan

[21] Appl. No.: 738,144

[22] Filed: May 24, 1985

[30] Foreign Application Priority Data

May 25, 1984 [JP] Japan .................. 59-106227

[51] Int. Cl.⁵ .............................. B62J 9/00
[52] U.S. Cl. ........................ 224/32 A; 190/124
[58] Field of Search .......... 224/32 A, 32 R, 30 R; 190/124

[56] References Cited

U.S. PATENT DOCUMENTS

| | | | |
|---|---|---|---|
| 3,807,537 | 4/1974 | O'Reilly | 190/124 X |
| 4,088,252 | 5/1978 | Grunberger | 224/210 |
| 4,260,084 | 4/1981 | Warren, Jr. | 224/32 A |
| 4,442,960 | 4/1984 | Vetter | 224/32 A |
| 4,460,114 | 7/1984 | Grenier | 224/32 A X |

FOREIGN PATENT DOCUMENTS 456183 2/1928 Fed. Rep. of Germany ... 224/32 A

OTHER PUBLICATIONS

Madden/U.S.A. Catalog.

*Primary Examiner*—Henry J. Recla
*Attorney, Agent, or Firm*—Lyon & Lyon

[57] ABSTRACT

A carrier bag for a motorcycle including a soft body and a hard cover hinged together to form a case enclosure. The soft body is of cloth while the hard cover is of a hard material such as plastic. The soft cover is preferably positioned against the side of the vehicle while the hard cover faces outwardly therefrom.

8 Claims, 5 Drawing Sheets

CARRIER BAG FOR A VEHICLE

BACKGROUND OF THE INVENTION

The field of the present invention is detachable containers for vehicles.

Two types of containers for use with motorcycles and other similar vehicles have been available. These include soft bags and hard bags. The soft bags are generally manufactured of cloth or soft plastic fibers sewn together in conventional fashion. They are easily attached to and removed from seats or fuel tanks of motorcycles. These soft bags are generally economical and convenient. They further can deflect or deform to accommodate bulky objects. However, such soft bags may experience excessive deflection or deformation when carrying heavy objects. Also because of the cloth nature of the material, they are prone to soiling.

Hard bags made of hard plastic material, light metal or the like, are generally less convenient and less economical. They generally require stays or supports for securing them to the vehicle bodies. They are better able to carry heavy loads but cannot deform to accommodate over-sized articles. Due to their solid construction, however they are less susceptible to soiling.

SUMMARY OF THE INVENTION

The present invention is directed to a novel carrier bag construction having both the advantages of the soft bags and of the hard bags. They are more easily attached and removed from motorcycle bodies. They are better able to accommodate heavy items without substantial deformation. They may be arranged to limit soiling and to provide an outward appearance of the hard bag construction.

To this end, the carrier bags of the present invention include a hard side and a soft side. One of the cover and the body of the case is of cloth material while the other is of hard material such as hard plastic.

Accordingly, it is an object of the present invention to provide an improved carrier bag for vehicles.

DETAILED DESCRIPTION OF THE PREFERRED EMBODIMENT

Figure 1:
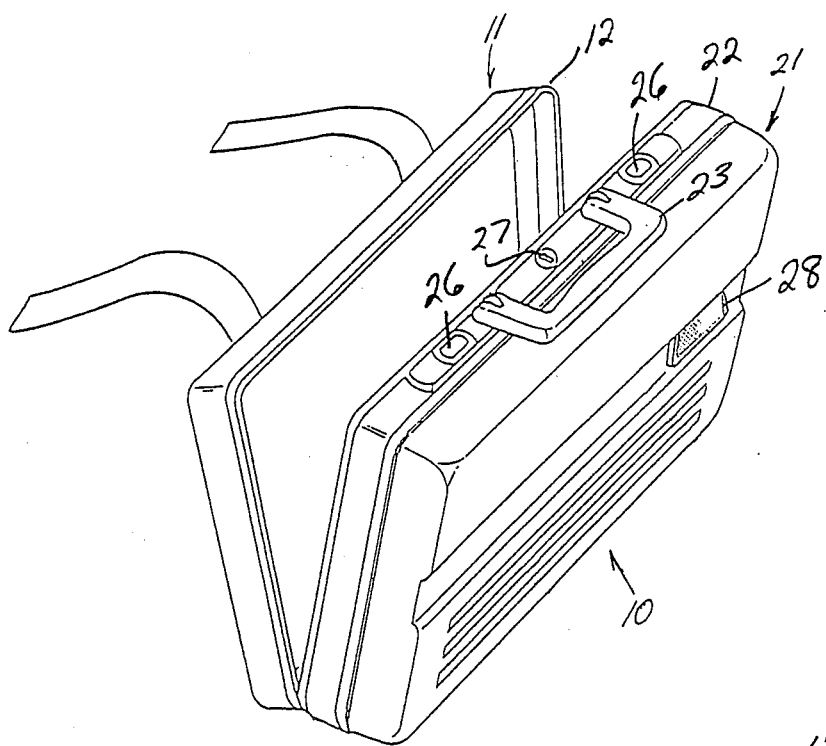
FIG. 1 is an oblique view of a carrier bag of the present invention.
Figure 2:
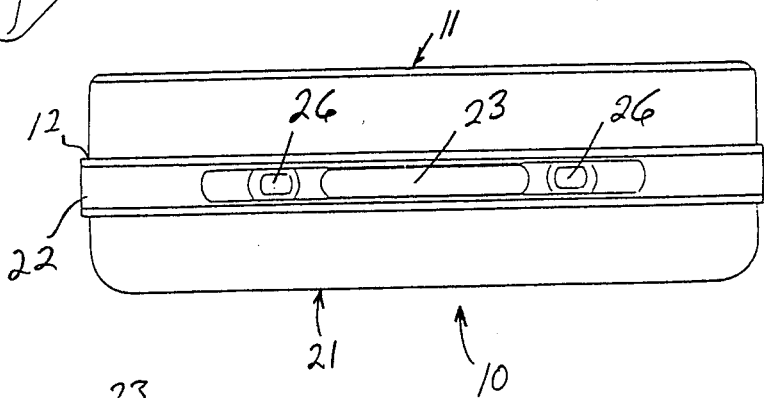
FIG. 2 is a top plan view of a carrier bag of the present invention.
Figure 3:
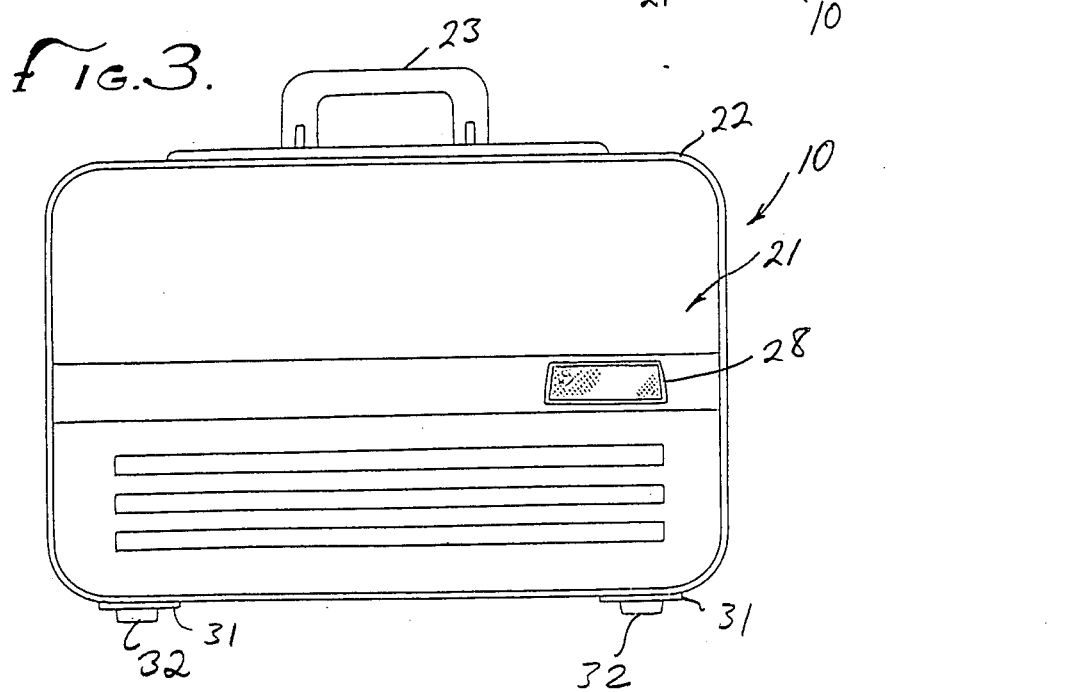
FIG. 3 is a front elevation view of a carrier bag of the present invention.

Turning in detail to the drawings, a bag, generally designated 10, defines a case having a body, generally designated 11, and a cover, generally designated 21. The body 11 is made of cloth such as woven nylon with the body being formed by sewing the cloth material into form. The cover 21 is formed of metal or hard plastic such as ABS. Thus, one side of the case is soft while the other side of the case is hard, or rigid.

Attached to each of the case members 11 and 21 are aluminum reinforcement frames 12 and 22, respectively. The members 11 and 21 are hinged together by means of hinges 31, 31 affixed to the frames 12 and 22 at the bottom of the case. The case may then be opened or closed as required by pivoting the cover 21 relative to the body 11 about the hinges 31. Feet 32 provide support for resting the bag on a flat surface.

Provided on the frame member 22 is a handle 23 which is pivoted thereto in a conventional manner. Latches 26, 26 are located in the frame 22 to retain the bag 10 in a closed state and allow for operative opening thereof. A lock 27 including a key cylinder is centrally located for effecting a security closer requiring a key for opening the carrier bag. A reflector 28 is arranged on the outside, or cover side 21, of the case 10.

Figure 4:
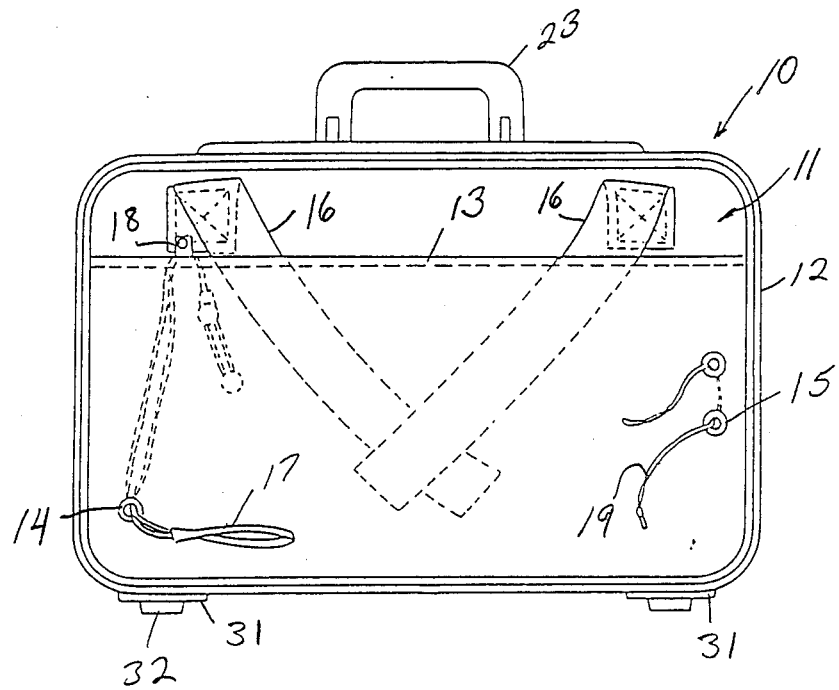
FIG. 4 is a back elevation view of a carrier bag of the present invention.
Figure 5:
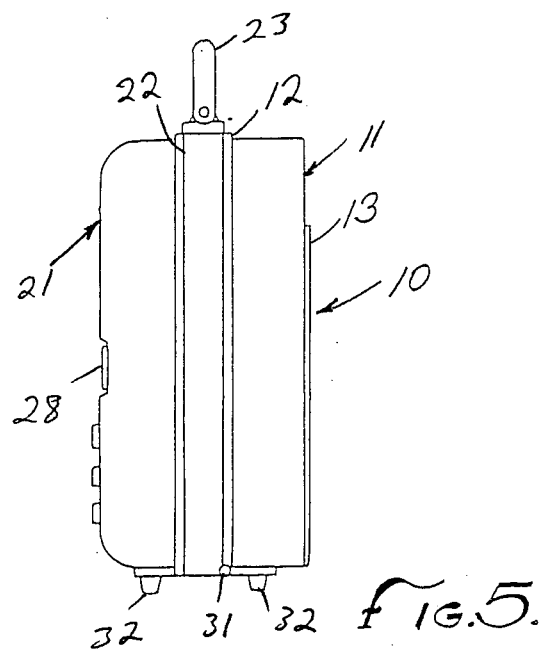
FIG. 5 is a side elevation view of a carrier bag of the present invention.

As can best be seen in FIG. 4, the body 11 of the case 10 includes on the external side thereof a large pocket 13. The pocket 13 extends across the major portion of the side of the bag leaving a small upper portion uncovered. In this upper portion, two straps 16, 16 are securely fastened such as by stitching to the body 11. The straps 16 are generally attached such that they can extend outwardly in a relatively parallel manner from the body 11 and also can be tucked into the pocket 13 as seen in FIG. 4. Pressure adhering material such as that sold under the trademark VELCRO may be employed on the surfaces of the straps 16 for cooperation with other straps of a companion bag.

Also providing tie means for the case along with the straps 16 are tie cords 17 and 19. These cords extend out from the pocket 13 through grommets 14 and 15 as illustrated in FIG. 4. The tie cord 17 is retained by a stop 18 sewn to the bag.

Figure 6:
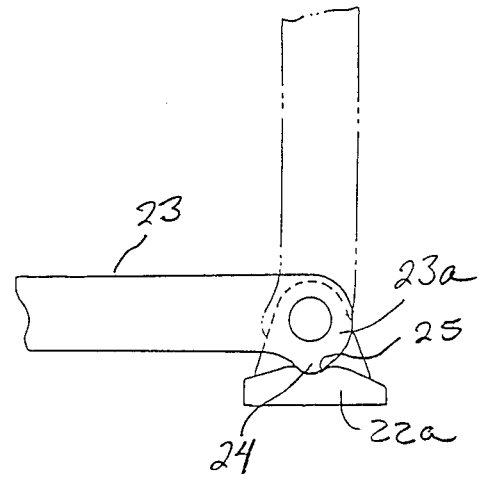
FIG. 6 is a detail side view of a handle associated with a carrier bag of the present invention.

Because the carrier bag is employed with a vehicle, it is preferred that the elements thereof not freely vibrate. The handle 23 may be retained in a folded-over position as can be seen in FIG. 6 by means of a click 24 integrally formed with the mounting boss 23a of the handle. A concavity 25 on the frame member 22a of the bag cooperates with the click 24 to retain the handle in the position illustrated.

To attach the bag including the tie elements described above, the soft portion of the bag is placed against the motorcycle and the cords 17 and 19 are tied to the motorcycle frame. Because the soft portion of the bag is placed next to the vehicle, vibration and rattling is avoided. This places the more easily soiled portion of the bag on the inside with the hard portion facing outwardly to reduce the chance of soiling and to provide an easily-cleaned outward surface.

Figure 9:
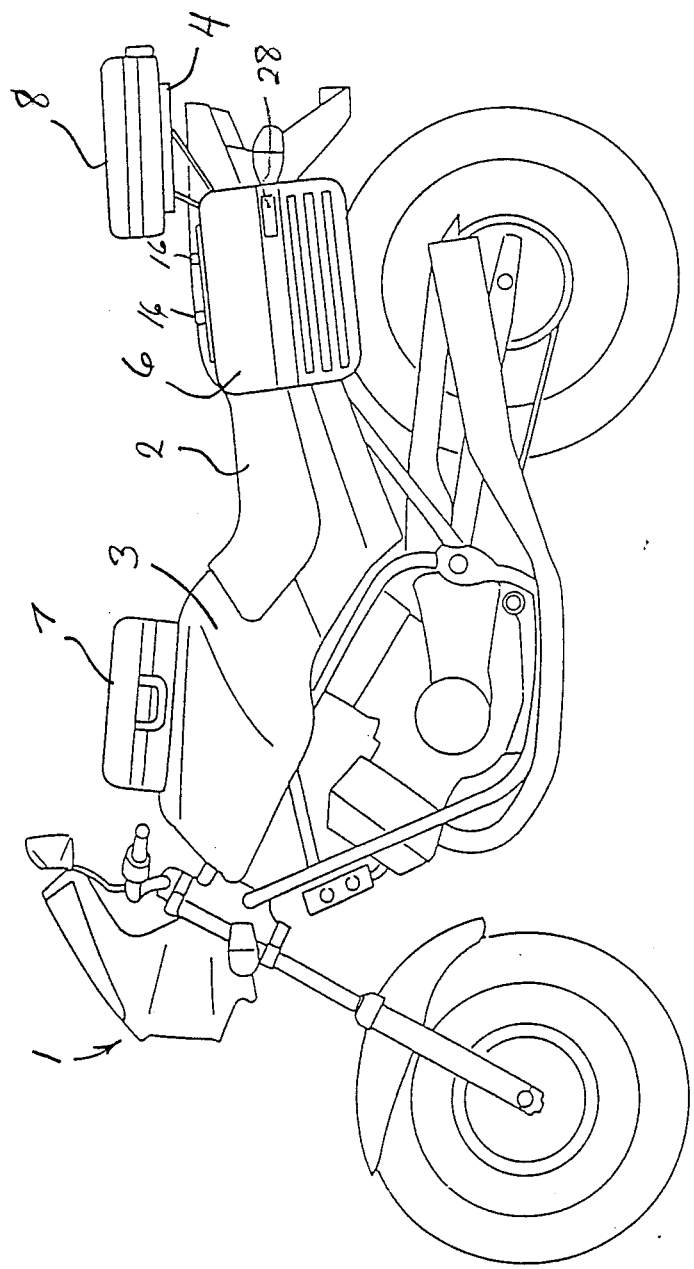
FIG. 9 is a side view of a motorcycle having carrier bags of the present invention.
Figure 10:
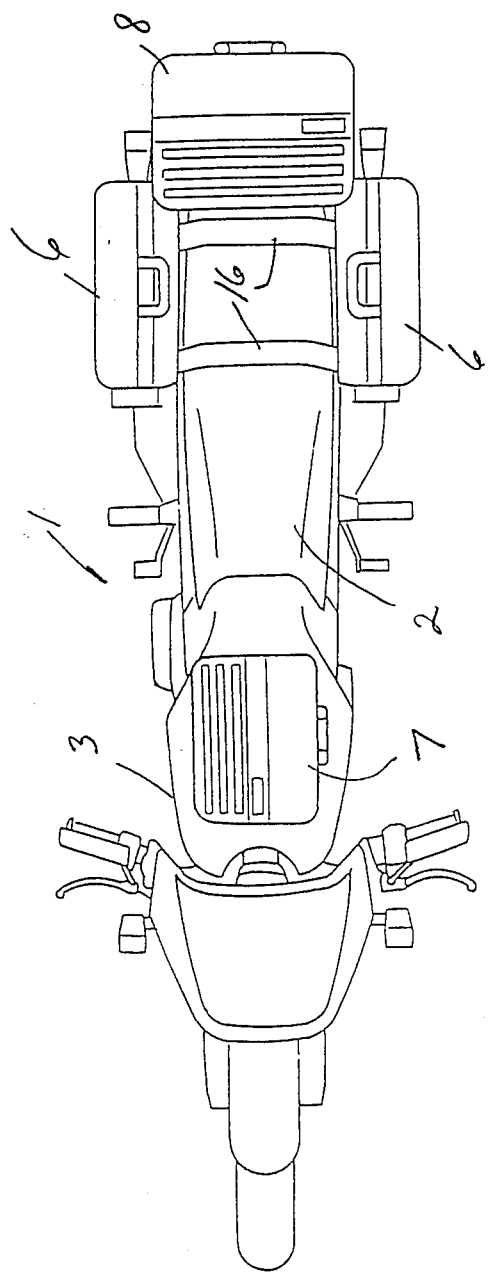
FIG. 10 is a plan view of a motorcycle having carrier bags of the present invention.

FIGS. 9 and 10 illustrate the placement of such a carrier bag on a motorcycle, generally designated 1. Carrier bags 6 are shown in the position of saddlebags on either side of a straddle-type seat 2. The carrier bag 7 is illustrated on a fuel tank 3 while a carrier bag 8 is illustrated on a rack 4. With the bags illustrated at 6, 6, the straps 16 cooperate across the vehicle by means of pressure adhering material between straps to retain the bags on either side of the rear portion of the seat 2.

With the bags constructed with the soft body 11 and the hard cover 21, the soft body may be attached to the vehicle at convenient locations without the need for a stay or other structure dedicated exclusively to retaining the bag. The outside of the bag is hard to support heavy objects and to resist soiling. The hard surface may also be readily cleaned.

The soft body conforms more readily to the vehicle case against the vehicle to protect both the case and the vehicle results. The soft portion is capable of expanding to a certain extent to accommodate oversized articles. Where a rack is available, such as illustrated at 4 in FIG. 9, the hard side may be placed down on the rack and an item which substantially deforms the soft portion of the bag may be placed therein, such as a helmet. Naturally, when the bag is properly stowed, the handle 23 may be folded over to engage the click 24 with the concavity 25 to prevent vibration thereof.

Figure 7:
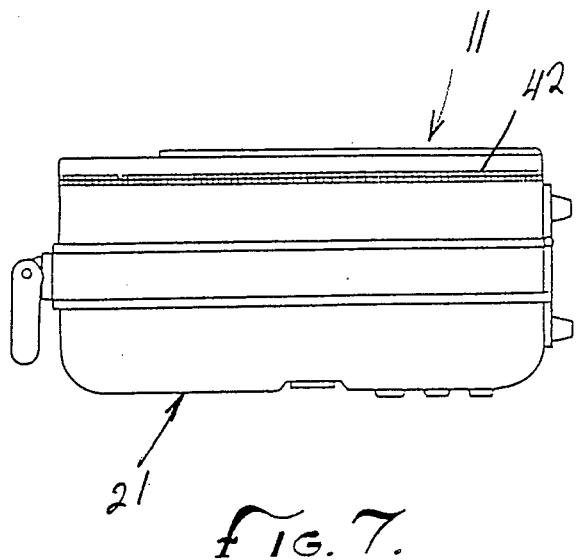
FIG. 7 is a side elevation of a second embodiment of the present invention.
Figure 8:
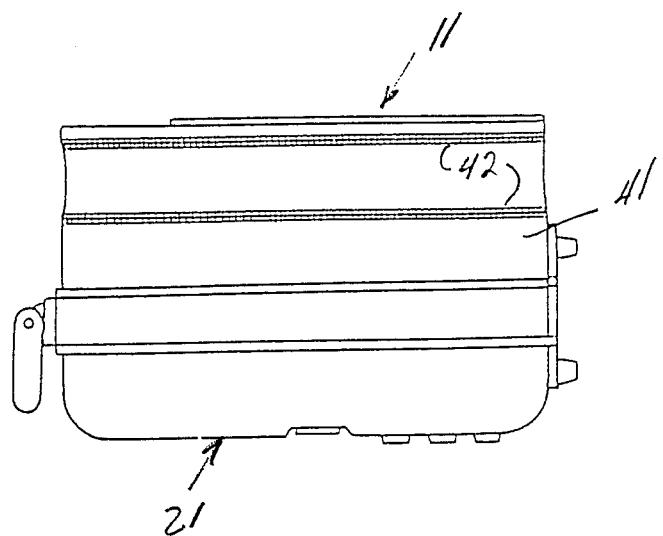
FIG. 8 is a side view of said second embodiment with an additional section illustrated therein.

Looking next to the embodiment of FIGS. 7 and 8, a zipper 42 may extend about the periphery of the soft body 11. The zipper 42 may be undone to lift off the outer portion of the body 11. A billows type insert 41 may then be zipped to one portion of the zipper 42 on one side thereof and to the other portion of the zipper 42 on the other side thereof. This provides an expanded enclosure for the bag particularly on the soft body portion of the case. In this way, larger articles such as helmets are more easily accommodated. With the billows type element 41 in place, the soft portion of the bag will naturally compact to fit the contents thereof.

Thus, an improved carrier bag for straddle-type vehicles such as motorcycles, motor scooters, motorized bicycles and conventional bicycles is disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A carrier bag comprising
   a case having a body and a cover hinged together to form an enclosure, said body being of cloth construction and said cover being of hard construction, said body and said cover each including a hard frame, said hard frames mating together to close said case; and
   tie means for tying said body against a vehicle, said tie means being on the cloth side of said case.

2. The carrier bag of claim 1 further comprising a handle affixed to said hard frame of one of said body and said cover.

3. The carrier bag of claim 1 wherein said hard construction includes a reflector.

4. A carrier bag comprising
   a case having a body of cloth construction and a cover of hard construction hinged together to form an enclosure, said body and said cover each including a hard frame, said hard frames mating together to close said case;
   tie means for tying said body against a vehicle, said tie means being on the cloth side of said case; and
   a reflector on said cover.

5. A carrier bag for a straddle type vehicle, comprising
   a case having a body of cloth construction and a cover of hard construction hinged together to form an enclosure, said body and said cover each including a hard frame, said hard frames mating together to close said case;
   tie means for tying said body against the vehicle, said tie means being on the cloth side of said case and said tie means including straps extending from the upper portion of said body and being spaced one from the other, said straps having a pressure adhering material thereon.

6. The carrier bag of claim 5 wherein said tie means further include tie cords extending from said body.

7. A carrier bag system for a motorcycle, comprising
   a left-hand case and a right-hand case, each case having a body of cloth construction and a cover of hard construction hinged together to form an enclosure, said body and said cover each including a hard frame, said hard frames mating together to close said case;
   tie means for tying each said body against the motorcycle, each said tie means including tie cords extending from said body to tie together about the frame of the motorcycle extending from the upper portion of each said body and being spaced one from the other, said straps on each said body having a pressure adhering material thereon to engage a said strap positioned from the other said body across the motorcycle.

8. The carrier bag system of claim 7 further comprising reflectors located on said covers.

* * * * *